United States Patent
Emo et al.

(10) Patent No.: US 7,382,562 B2
(45) Date of Patent: Jun. 3, 2008

(54) PREAMPLIFIER FOR USE IN DATA STORAGE DEVICES

(75) Inventors: Bruce D. Emo, Longmont, CO (US); Peter S. Harllee, III, Boulder, CO (US); Dale T. Riley, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 276 days.

(21) Appl. No.: 11/220,228

(22) Filed: Sep. 6, 2005

(65) Prior Publication Data

US 2007/0053092 A1 Mar. 8, 2007

(51) Int. Cl.
*G11B 5/09* (2006.01)
(52) U.S. Cl. .......................................... 360/46; 360/66
(58) Field of Classification Search ...................... None
See application file for complete search history.

(56) References Cited

U.S. PATENT DOCUMENTS

| 5,991,113 | A | 11/1999 | Meyer et al. ................... 360/75 |
| 6,643,081 | B1* | 11/2003 | Walker et al. ................. 360/31 |
| 6,744,586 | B2* | 6/2004 | Ukani et al. ................... 360/69 |
| 2004/0240109 | A1* | 12/2004 | Hamann et al. ............. 360/126 |
| 2005/0094300 | A1* | 5/2005 | Yano et al. ..................... 360/31 |
| 2005/0105204 | A1 | 5/2005 | Bloodworth et al. .......... 360/75 |

* cited by examiner

*Primary Examiner*—Andrea Wellington
*Assistant Examiner*—Varsha A. Kapadia
(74) *Attorney, Agent, or Firm*—Alan G. Rego; Westman, Champlin & Kelly, P.A.

(57) ABSTRACT

A preamplifier that includes an input configured to receive a preamplifier control signal and a fault detection circuit configured to monitor the preamplifier control signal received at the input is provided. The fault detection circuit is further configured to identify a fault condition triggered by an improper temperature control signal provided by the preamplifier.

20 Claims, 3 Drawing Sheets

PREAMPLIFIER FOR USE IN DATA STORAGE DEVICES

FIELD OF THE INVENTION

The present invention relates generally to data storage devices, and more particularly but not by limitation to a preamplifier for a head in a data storage device.

BACKGROUND OF THE INVENTION

Disc storage systems are known in the art and are used to store information for later retrieval. Such disc storage systems include a rotatable disc which carries information thereon. A transducing head is positioned over a surface of the disc while the disc rotates at high speed. The head is carried on a slider which is designed to "fly" just over the surface of the rotating disc, the separation between the slider and the disc being maintained by a film of air (air bearing). The head is used to write information onto the disc or read information from the disc when the slider flies over the disc surface. Such information may be, for example, magnetically or optically encoded on the disc surface.

Increased storage density is becoming increasingly important. One technique known to increase storage density is to decrease the "fly height" of the head. Fly height is defined as the distance between the disc surface and the head or slider during operation of the storage system. A reduced fly height allows information to be written or read back more precisely and such information can be stored in a smaller area (i.e., at a higher density).

Recently, several adaptive fly height control techniques, that address the need for reduced fly height in high-density disc storage systems, have been developed. One fly height control technique includes adjusting the slider fly height by warping a portion of the slider by adding heat to a portion of the slider near the transducer. In such fly height control systems, which are often implemented in a preamplifier (component whose primary function is to amplify data signals detected by the head(s)) of a disc storage system, inadvertently writing data to the disc without heating and preheating the slider to obtain proper target head clearance or fly height can lead to poorly written data, possibly compromising data integrity.

Embodiments of the present invention provide solutions to these and other problems, and offer other advantages over the prior art.

SUMMARY OF THE INVENTION

A preamplifier that includes an input configured to receive a preamplifier control signal and a fault detection circuit configured to monitor the preamplifier control signal received at the input is provided. The fault detection circuit is further configured to identify a fault condition triggered by an improper temperature control signal provided by the preamplifier.

Other features and benefits that characterize embodiments of the present invention will be apparent upon reading the following detailed description and review of the associated drawings.

DETAILED DESCRIPTION OF ILLUSTRATIVE EMBODIMENTS

In the embodiments described below, a preamplifier circuit, for use with a head that communicates with a disc, includes circuitry that helps prevent the inadvertent writing of data to the disc, without the head being properly heated and/or preheated to obtain target head clearance or fly height. Before describing embodiments of the present invention in greater detail, one illustrative embodiment in which the present invention can be used will be discussed.

Figure 1:
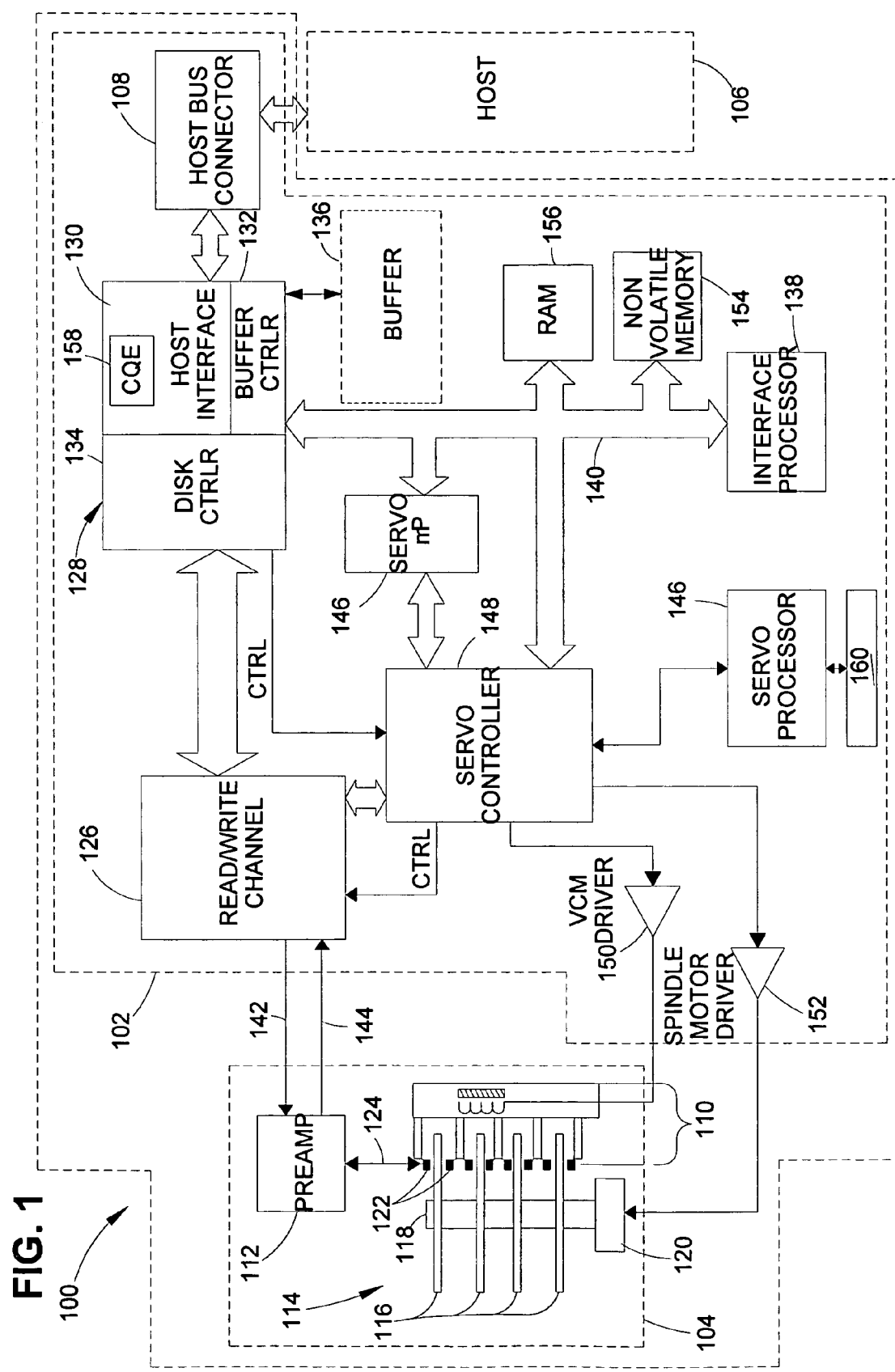
FIGS. 1 and 2 are simplified block diagrams of disc storage systems in accordance with embodiments of the present invention.

Referring now to FIG. 1, a simplified block diagram of a disc storage system employing a preamplifier that is capable of identifying a write without heat fault (fault defined to prevent the inadvertent writing of data to the disc, without the head being properly heated and/or preheated to obtain target head clearance or fly height) in accordance with an embodiment of the present invention is shown. Disc storage system 100 includes a printed circuit board assembly (PCBA) 102 and a head-disc assembly (HDA) 104. PCBA 102 includes circuitry and processors, which provide a target interface controller (or drive controller) for communicating between a host system 106 and HDA 104. Host system 106 can include a microprocessor-based data processing system such as a personal computer or other system capable of performing a sequence of logical operations. Data is transmitted between host system 106 and PCBA 102 via a host bus connector 108. HDA 104 includes an actuator assembly 110, a preamplifier 112, and a disc assembly 114. Disc assembly 114 includes one or more media discs, stacked on a spindle assembly 118. Spindle assembly 118 is mechanically coupled to a spindle motor 120 for rotating the disc(s) at a high rate of speed.

Actuator assembly 110 includes a voice coil motor, and multiple actuator arms. Located at the end of each actuator arm are one or more transducer heads such as 122, which are associated with a respective disc surface. Transducer heads 122 communicate with disc controller circuit board 102 via a cable assembly 124 connected to preamplifier 112 for reading and writing data to the transducer head's associated disc surface. Preamplifier 112 provides an amplified signal to a read/write channel 126 of PCBA 102. Read/write channel 126 performs encoding and decoding of data written to and read from the disc.

A servo processor 146 provides intelligent control of actuator assembly 110 and spindle motor 120 through a servo controller 148. By commands issued to servo controller 148 by servo processor 146, VCM driver 150 is coupled to move actuator assembly 110 and spindle motor driver 152 is coupled to maintain a constant spin rate of spindle motor 120.

PCBA 102 includes a host interface disc controller (HIDC) application-specific integrated circuit (ASIC) 128. ASIC 128 includes a host interface 130, a buffer controller 132, and a disc controller 134. Host interface 130 communicates with host system 106 via host bus connector 108 by receiving commands and data from and transmitting status and data back to host system 106. A command cueing engine (CQE) 158 is incorporated in host interface 130.

Buffer controller 132 controls a non-volatile buffer memory 136. Disc controller 134 tracks the timing of data sectors passing under a currently selected transducer head and accordingly sends data to and receives data from read/ write channel 126. Disc controller 134 also provides for error correction and error detection on data transmitted to and read from discs 114.

An interface processor 138 manages a queue of commands received from host 106 with the assistance of the CQE 158 embedded in host interface 130. Interface processor 138 interfaces with functional elements of PCBA 102 over a bus 140, for transfer of commands, data, and status.

Disc system operational programs may be stored in non-volatile program storage memory 154, such as read-only memory (ROM) or flash memory, and are loaded into random access memory (RAM) or program loading memory 156 for execution by interface processor 138. Suitably, servo processor 146 may have integrated or separate memory 160 for storage of servo programs.

As mentioned above, preamplifier 112 provides an amplified signal to a read/write channel 126 of PCBA 102. Further, preamplifier 112 includes fly height control circuitry and associated head-heating circuitry (not shown in FIG. 1). Also, in accordance with the present invention, preamplifier 112 includes fault detection circuitry (not shown in FIG. 1), which helps prevent the inadvertent writing of data to the disc, without the head being properly heated and/or preheated to obtain target head clearance or fly height. In embodiments of the present invention, PCBA or drive controller 102 also includes fault handling circuitry (not shown in FIG. 1) that services different faults, including a write without heat fault. An embodiment of the present invention, which shows fault detection circuitry, fault handling circuitry and other components utilized to detect and handle a write without heat fault condition is described below in connection with FIGS. 2 and 3.

Figure 2:
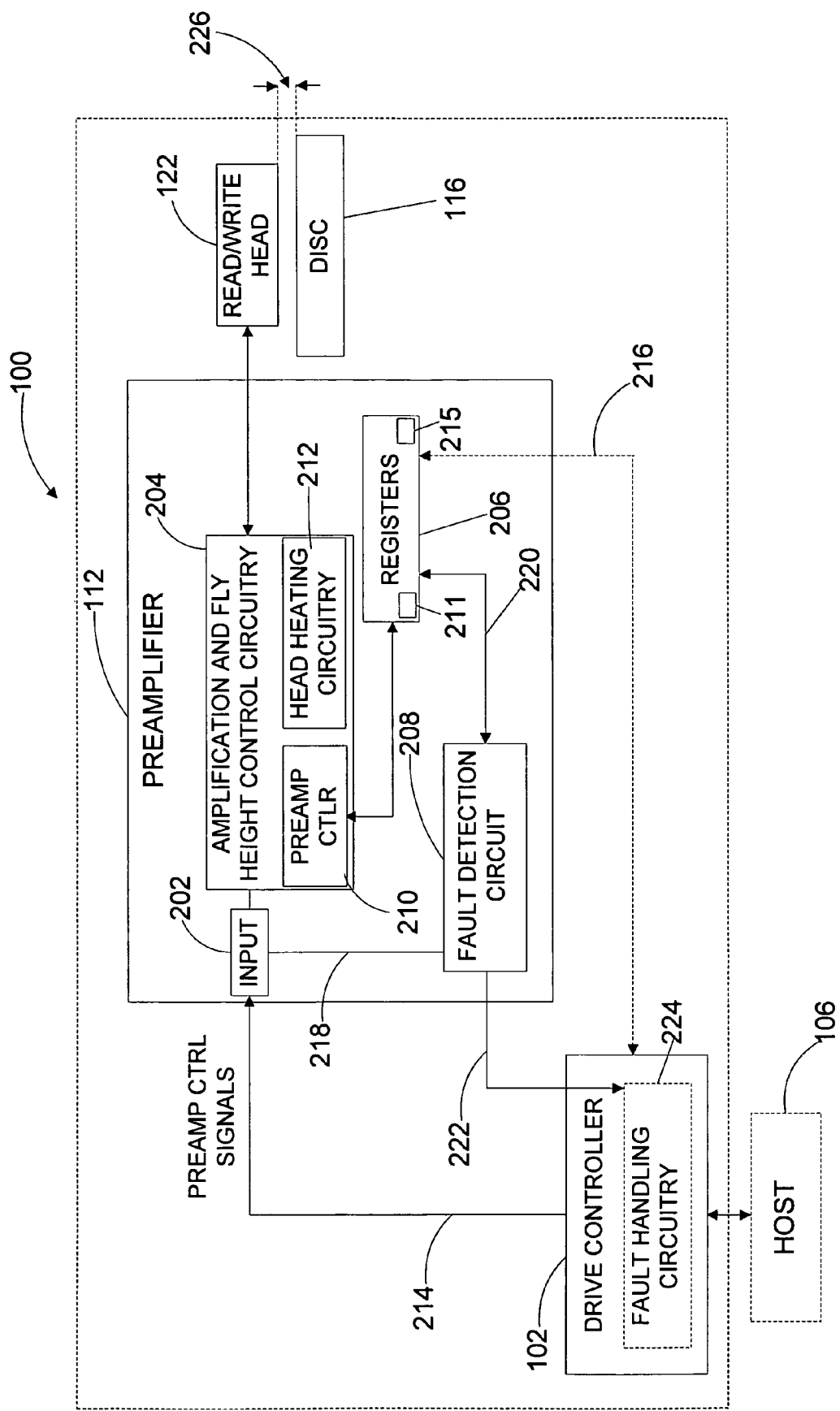

Referring now to FIG. 2, a simplified block diagram of a disc storage system that includes circuitry for detecting and handling write without heat faults in accordance with an embodiment of the present invention is shown. As can be seen in FIG. 2, preamplifier 112 includes an input 202, signal amplification and fly height control circuitry 204, registers 206 and fault detection circuit 208. Portions of preamplifier 112 may be realized by way of more than one integrated circuit or discrete components, or integrated into a large scale integrated circuit. In preamplifier 112, circuitry 204 includes a preamplifier and fly height controller 210 and a slider or head-heating circuit 212, which is used to adjust fly height 226. Head heating circuitry 212 can be, for example, a circuit that provides an electrical current (voltage or power) to a resistance heating element (not shown) in head/slider 122. In general, circuitry 212 can be any circuitry that provides a temperature control signal (current, voltage, power, etc.) to another component external or internal to preamplifier 112. Preamplifier controller 210 enables/disables (or turns on/shuts off) different circuits within component 204 based on contents of registers 206 and preamplifier control signals that it receives via input 202, which, in turn, receives the preamplifier control signals from drive controller 102 via control line 214. Control line 214 can comprise multiple hardware lines. Registers 206 are updated by disc controller 102 via control line 216. Fault detection circuit 208 is coupled to input 202 and registers 208 via control lines 218 and 220, respectively. Fault detection circuit 208 monitors input 202 and registers 206, and reports faults to drive controller 102 via control line 222, which is typically a hardware line. Fault handling circuitry 224, which is also included in drive controller 102 in addition to the other components shown in FIG. 1, is capable of servicing the fault condition(s). Details regarding the operation of fault detection circuit 208 and fault handling circuitry 224 are provided below in connection with FIG. 3, which shows steps that take place during a write operation carried out by the system of FIG. 2.

Figure 3:
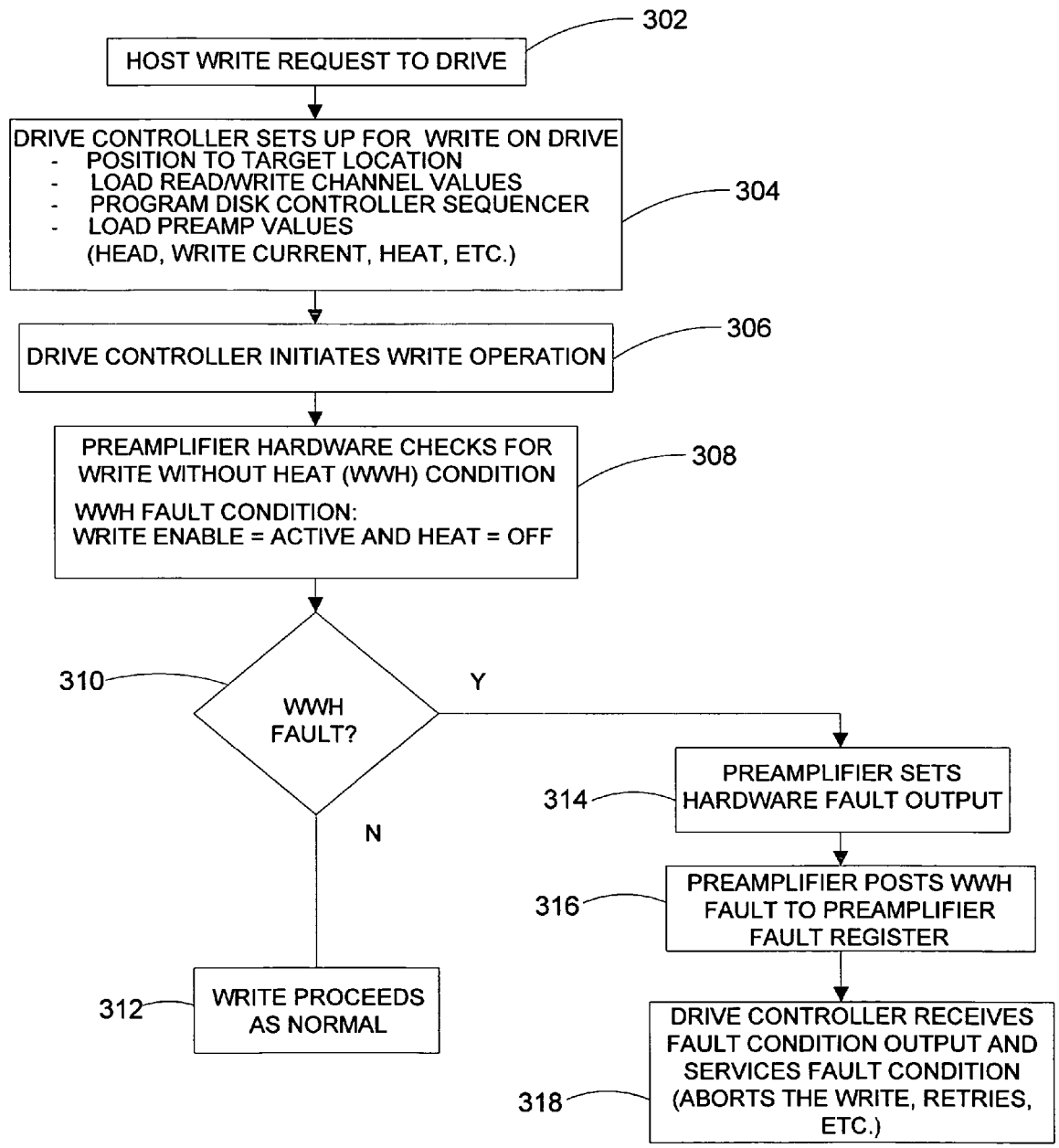
FIG. 3 is a flowchart of a method of detecting and handling write without heat faults in accordance with an embodiment of the present invention.

In the operation shown in FIG. 3, host 106 sends a write request for processing by disc drive 100. This is illustrated at step 302. Upon receipt of the write request, drive controller 102 carries out preliminary/setup functions necessary for carrying out a write operation. These preliminary functions include positioning the head(s) 122 at a target location or locations (location(s) on the disc(s) 116 at which the information is to be written); loading appropriate read/write channel values for carrying out the write operation; programming a disc controller sequencer to sequence blocks of information that are to be written to the disc(s) 116; and loading preamplifier values (head identification number, write current value(s), heat-on indicator value, etc.) into registers 206. Based on the contents of registers 206, preamplifier controller 210 turns on appropriate circuitry to carry out functions necessary for the write operation. For example, if a heat-enable flag 211 is set to on in registers 206, preamplifier controller 210 turns on head heating circuit 212, which, in turn, heats the head(s) 122. The setup functions are illustrated at step 304.

Once drive controller 102 and preamplifier 112 are set up for carrying out a write operation as indicated in step 304, drive controller 102 initiates the write operation. Initiating the write operation includes drive controller 102 sending a write enable logic signal via control line 214 to preamplifier input 202. The write operation initiation step is illustrated at step 306.

As mentioned above, fault detection circuit 208 monitors input 202 and the contents of registers 206. In embodiments of the present invention, a write-without-heat fault is defined for a condition in which heat-enable flag 211 is set to off in registers 206 when a write-enable logic signal is received at input 202. Fault detection circuit 208 checks for this write-without-heat condition by monitoring heat-enable flag 211 and input 202. This is illustrated at steps 308 and 310.

If a write-enable logic signal is received at input 202 when heat-enable flag 211 is set to on, the write operation proceeds as normal. This is illustrated at step 312. However, if the write-enable logic signal is received at input 202 when heat-enable flag 211 is set to off, control proceeds to step 314. Here, fault detection circuit 208 notifies disc controller 102 of the write-without-heat fault via control line 222. Further, fault detection circuit 208 sets a write-without-heat-fault flag 215 to on in registers 206. This is illustrated at step 316. Upon receiving a notification of a write-without-heat fault condition as indicated in step 314, drive controller 102, with the help of fault handling circuitry 224, services the fault condition (aborts the write operation, retries the write, etc.).

By including write without heat fault detection circuitry (which can include any suitable components that are capable of carrying out the write-without-heat-fault detection as described above) in the preamplifier hardware, the present invention allows for write-without-heat fault detection in substantially real-time, thereby helping maintain data integrity. It should be noted that, although the above embodiments describe fault detection circuit 208 as being primarily a circuit configured to detect a write-without-heat fault condition, circuit 208 can be any circuit that is capable of identifying a fault condition triggered by an improper temperature control signal provided by circuit 212 of preamplifier 112. An "improper temperature control signal" can include the absence of a temperature control signal. For example, when circuit 212 is disabled, no heating of the head(s) 122 takes place due to the lack of a temperature control signal. Improper temperature control signals can also include signals that have values above or below a predetermined threshold.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the preamplifier while maintaining substantially the same functionality without departing from the scope and spirit of the present invention. In addition, although the preferred embodiment described herein is directed to a preamplifier for a disc storage system, it will be appreciated by those skilled in the art that the teachings of the present invention can be applied to any system that employs that employs read/write head heaters, without departing from the scope and spirit of the present invention.

What is claimed is:

1. A preamplifier comprising:
   an input configured to receive a preamplifier control signal; and
   a fault detection circuit configured to monitor the preamplifier control signal, and to identify a fault condition triggered by an improper temperature control signal provided by the preamplifier,
   wherein the improper temperature control signal is indicative of a failure to properly heat a head with which the preamplifier communicates.

2. The preamplifier of claim 1 wherein the fault detection circuit is configured to identify the fault condition if a signal that enables a write operation is received at the input when a circuit that heats the head is disabled.

3. The preamplifier of claim 2 and further comprising registers that are configured to store preamplifier control values.

4. The preamplifier of claim 3 wherein the fault detection circuit is further configured to determine that the circuit that heats the head is disabled if a flag, that enables heating, in the registers is set to off.

5. The preamplifier of claim 3 wherein, upon identification of the fault condition, the fault detection circuit is further configured to set a flag, for the fault condition, in the registers to on.

6. A disc drive comprising the preamplifier of claim 3.

7. The apparatus of claim 6 and further comprising a drive controller having a fault handling circuit.

8. The apparatus of claim 7 wherein the fault detection circuit is further configured to output an indicator, for the fault condition, to the disc controller.

9. The apparatus of claim 8 wherein, upon receipt of indicator, for the fault condition, by the disc controller, the fault handling circuit is configured to service the fault.

10. The apparatus of claim 9 wherein the fault handling circuit is configured to service the fault by updating preamplifier control values in the registers.

11. A method implementable in a data storage system having a drive controller and a preamplifier, the method comprising:
    receiving a request, in the drive controller, to write data;
    setting preamplifier control values for carrying out a write operation;
    initiating the write operation by sending a logic signal, for enabling the write operation, to the preamplifier; and
    identifying a fault condition if the logic signal is received in the preamplifier when an improper temperature control signal is provided by the preamplifier,
    wherein the improper temperature control signal is indicative of a failure to properly heat a head with which the preamplifier communicates.

12. The method of claim 11 wherein setting preamplifier control values for carrying out a write operation comprises updating registers in the preamplifier.

13. The method of claim 12 wherein an improper temperature control signal is provided by the preamplifier when a circuit that heats the head is disabled.

14. The method of claim 13 and further comprising determining that the circuit that heats the head is disabled if a flag, that enables heating, in the registers is set to off.

15. The method of claim 13 and further comprising, upon identification of the fault condition, setting a flag, for the fault condition, in the registers to on.

16. The method of claim 13 and further comprising outputting, form the preamplifier, an indicator, for the fault condition, to the disc controller.

17. The method of claim 16 and further comprising servicing the fault upon receipt of the indicator, for the fault condition, by the disc controller.

18. The method of claim 17 wherein servicing the fault comprises updating preamplifier control values in the registers.

19. A preamplifier comprising:
    an input configured to receive preamplifier control signals; and
    means, in the preamplifier, for identifying a fault condition triggered by an improper temperature control signal provided by the preamplifier,
    wherein the improper temperature control signal is indicative of a failure to properly heat a head with which the preamplifier communicates.

20. A disc drive comprising the preamplifier of claim 19.

* * * * *